United States Patent Office 2,728,745
Patented Dec. 27, 1955

2,728,745

N-(p-CINNAMOYLPHENYL) URETHANES OF HYDROXYL-CONTAINING POLYMERS

Albert C. Smith, Jr., and Cornelius C. Unruh, Rochester, N. Y., assignors to Eastman Kodak Company, Rochester, N. Y., a corporation of New Jersey No Drawing. Application March 23, 1954,
Serial No. 418,218

17 Claims. (Cl. 260—66)

This invention relates to N-(cinnamoylphenyl) urethanes of hydroxyl-containing polymers, and to a process for their preparation.

It is known that certain cinnamic acid esters are light-sensitive and can be used in the art of photomechanical reproduction. For example, L. M. Minsk et al., in U. S. Patent 2,610,120, dated September 9, 1952, show that polyvinyl cinnamates can be utilized for making light-sensitive compositions adapted for the production of resist images for printing plates. The above polyvinyl cinnamates in the absence of sensitizers are, however, relatively low in light sensitivity. It would, therefore, be very desirable to provide materials having greater inherent sensitivity. We have now found that N-(cinnamolyphenyl) urethane derivatives of hydroxyl-containing polymers undergo changes in solubility on exposure to light having speeds without added sensitizers up to about 280 times that of unsensitized polyvinyl cinnamate, and can be further sensitized by such addenda as Michler's Ketone (tetramethyldiaminobenzophenone) and 2-benzoylmethylene-1-methyl-β-naphthothiazoline.

It is, accordingly, an object of our invention to provide a new class of resinous polymers. A further object is to provide compositions which are light-sensitive and particularly useful for photomechanical reproduction processes. Another object is to provide sensitizer compounds capable of increasing the light sensitivity of the new polymers. Another object is to provide processes for preparing the new class of polymers and materials containing these polymers. Other objects will become apparent from the following description and examples.

In accordance with our invention, we prepare our new class of polymers by reacting hydroxyl-containing polymers, i. e. polymers containing at least one functional hydroxyl group, with p-isocyanoacetophenone to form the corresponding p-acetophenylurethanes of the hydroxyl-containing polymers, and then treating the derived polymers with an aromatic aldehyde, with or without a mutual solvent, in the presence of a catalyst such as a mineral acid e. g. sulfuric acid, phosphoric acid, etc. to give the corresponding N-(p-cinnamoylphenyl) urethanes or substituted N-(p-cinnamoylphenyl) urethanes of the invention. Mixtures of aromatic aldehydes can also be used. Ordinarily, the amount of p-isocyanoacetophenone employed is equivalent to the number of hydroxyl groups to be esterified, but amounts as much as 10 times the stoichiometrically calculated gram-molecular equivalent can be used, if desired. The amounts of aromatic aldehyde employed can also range from molecular equivalents of less than 1 to about 10 times the necessary calculated quantity for complete conversion of the urethane groups to the cinnamoylphenyl derivatives. The reaction with p-isocyanoacetophenone is carried out, preferably at temperatures of from 30°–100° C. The reaction with the aromatic aldehydes can also be carried out by heating, but preferably at about room temperatures in the dark.

Typical hydroxyl-containing starting polymers in the above process include polyvinyl alcohol, partially hydrolyzed polyvinyl esters such as partially hydrolyzed polyvinyl acetate, polyvinyl propionate, polyvinyl butyrate, etc., partially or completely hydrolyzed copolymers of a vinyl carboxylic ester such as hydrolyzed copolymers of vinyl acetate with ethylene, of vinyl acetate with vinyl chloride, of vinyl acetate with vinyl ethyl ether, of vinyl acetate with acrylonitrile, of vinyl acetate with methacrylonitrile, vinyl acetate with acrylic or methacrylic acid, vinyl butyrate with ethylene, etc., starch, guar, cellulose, cellulose derivatives such as partially esterified or etherified cellulose e. g. cellulose acetate, cellulose propionate, cellulose butyrate, cellulose acetate-propionate, cellulose acetate-butyrate, cellulose ethyl ether, cellulose methyl ether, etc., hydroxyalkyl celluloses such as hydroxyethyl cellulose, and the like.

The preferred aromatic aldehydes which can be employed in the above reaction can be represented by the general formula:

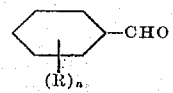

wherein $n$ represents an integer 1 or 2 and R represents a member such as a hydrogen atom, a halogen atom such as chlorine or bromine, a methylene dioxy group, an alkyl group containing from 1 to 4 carbon atoms e. g. methyl, ethyl, isopropyl, butyl, etc. groups, an alkoxy group containing from 1 to 4 carbon atoms e. g. methoxy, ethoxy, propoxy, butoxy, etc. groups, an acetamino group, a —COOR$_1$ group wherein R$_1$ represents a hydrogen atom or an alkali metal atom e. g. sodium or potassium, an —SO$_3$R$_1$ group wherein R$_1$ has the above definition and a

group wherein R$_2$ represents an alkyl group containing from 1 to 4 carbon atoms. Other aromatic aldehydes which can also be employed include 1-naphthaldehyde, 2-naphthaldehyde, 9-anthraldehyde, 1,8-naphthaldehydic acid, etc. Typical aromatic aldehydes coming within the above definition include benzaldehyde, monoalkyl substituted benzaldehydes such as o-tolualdehyde, m-tolualdehyde, p-tolualdehyde and corresponding ethyl-, propyl- and butyl-benzaldehydes, dialkyl substituted benzaldehydes such as 2,5-dimethyl-benzaldehyde, 3,5-dimethyl-benzaldehyde, 2,6-dimethyl-benzaldehyde, furfuraldehyde, cinnamaldehyde, etc. and corresponding diethyl-, dipropyl- and dibutyl-benzaldehydes, monoalkoxy substituted benzaldehydes such as m-methoxy-benzaldehyde, o-methoxy-benzaldehyde etc. and corresponding ethoxy-, propoxy- and butoxy-benzaldehydes, dialkoxy substituted benzaldehydes such as 3,4-dimethoxy-benzaldehyde, 2,5-dimethoxy-benzaldehyde etc. and corresponding diethoxy-, dipropxy- and dibutoxy-benzaldehydes, the mono- and dihydroxy benzaldehydes, vanillin, isovanillin, piperonal, the carboxy-benzaldehydes such as o-aldehydo-benzoic acid, p-aldehydo-benzoic acid, etc. and sodium and potassium salts thereof, the sulfo-benzaldehydes such as benzaldehyde-m-sulphonic acid, benzaldehyde-o-sulphonic acid, etc. and sodium and potassium salts thereof, acetamino-benzaldehydes such as p-acetaminobenzaldehyde, etc., and aminobenzaldehydes such as p-dimethyl- and p-diethyl-aminobenzaldehydes, and the like.

Accordingly, our new class of polymeric compounds are characterized by containing the recurring p-cinnamoylphenyl urethane group having the structure:

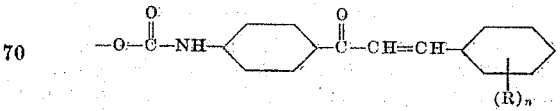

wherein $n$ and R have the previously given definitions. For example, the polymers of our invention such as those where the starting polymeric material is polyvinyl alcohol comprise the recurring vinyl-N-(p-cinnamoylphenyl)urethane group

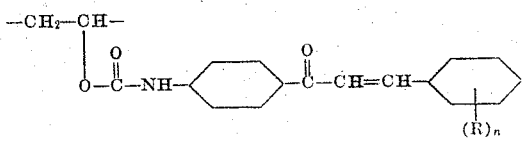

wherein $n$ and R are as above defined, and in some cases may also contain some residual unreacted p-acetophenyl urethane and vinyl alcohol groups; those where the starting polymeric material is a partially acetalized polyvinyl alcohol comprise the characteristic recurring vinyl-N-(p-cinnamoylphenyl) urethane group and the recurring vinyl acetal group

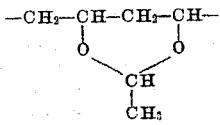

and in some cases may also contain some residual unreacted p-acetophenyl urethane and vinyl alcohol groups; those where the starting polymeric material is a partially hydrolyzed polyvinyl acetate comprise the characteristic recurring vinyl-N-(p-cinnamoylphenyl) urethane group and the recurring vinyl acetate group

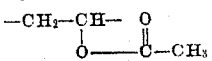

and in some cases may also contain some residual unreacted p-acetophenyl urethane and vinyl alcohol groups. The carbohydrate polymers of the invention similarly contain the N-(p-cinnamoylphenyl) urethane group by esterification of hydroxyl groups on the polymer, and depending on the starting polymer, may also contain other ester and ether groups, as well as some unreacted p-acetophenyl urethane and hydroxyl groups in the cases where the reaction by our process have been carried out only to partial completion.

Most of the polymers of our invention are soluble in one or more of the common organic solvents such as acetone, dioxane, methyl ethyl ketone, pyridine, methyl Cellosolve, ethyl Cellosolve, Cellosolve esters, chlorinated hydrocarbons, etc. Such solutions are useful for various purposes such as for the sizing of fibrous materials, the polymer being converted to the insoluble form on exposure of the sized or impregnated material to light. They are also useful for the coating of various surfaces, and especially useful for forming resist images on printing plate supports such as aluminum, zinc, copper and magnesium and various alloys thereof. When coatings of the polymers on such supports are light exposed to a subject such as a line, half-tone or continuous tone image, the coatings are rendered insoluble in organic solvents in the area of exposure, and the unexposed area can then be readily removed with one or more of the above-mentioned solvents. When sensitizing agents are incorporated into the solutions of polymer, the light sensitivity of the resulting coatings are increased and, accordingly, the exposure time of the process is decreased. The resulting relief image of insoluble polymer can then be used as a plate etching resist or if prepared on a lithographic surface such as zinc, surface-hydrolyzed cellulose ester, casein, etc., the relief image can be inked and printed on a lithographic or other printing press.

The invention is illustrated by the following examples of certain preferred embodiments thereof.

*Example 1.—Preparation of p-isocyanoacetophenone*

Two liters of chlorobenzene was placed in a 5-liter, 3-neck flask fitted with a reflux condenser, fritted gas inlet tube and efficient stirrer, and cooled in an ice-salt bath. A good stream of phosgene gas was introduced for one hour, after which 500 g. of p-aminoacetophenone was added with stirring. The mixture was allowed to stand at room temperature overnight. Then the mixture was heated at 110° C. under a stream of phosgene for 5 hours. The temperature was then increased to 145° C. over a period of 2 hours and a dark solution formed. After standing overnight at room temperature, the chlorobenzene was removed under water aspirator vacuum, and the residual solution vacuum distilled giving 500 g. of a water-soluble fraction boiling at 93° C./1.1 mm. pressure. Analysis of this fraction gave by weight 66.6% carbon, 4.5% hydrogen and 8.6% nitrogen compared for calculated values for p-isocyanoacetophenone of 65.9%, 4.35% and 8.7%, respectively. The product was, therefore, substantially pure p-isocyanoacetophenone. The compound solidified at room temperature and deteriorated on standing.

*Example 2.—Polyvinyl-N-(p-acetophenyl) urethane*

Twenty-two grams (0.5 mol) of polyvinyl alcohol containing less than 1% by weight of residual acetyl groups was stirred in 250 cc. of dry pyridine at steam bath temperature for 45 minutes. To this was added 90 g. (0.55 mol) of p-isocyanoacetophenone in portions. Heat was evolved, and when all p-isocyanoacetophenone had been added, there was obtained a clear, viscous liquid. Heating and stirring were continued. After 4 hours, the solution was diluted with two volumes of pyridine and precipitated into 25 liters of water. A fine precipitate of polyvinyl-N-(p-acetophenyl) urethane was obtained. The precipitate was washed four times with fresh water and air dried at 40° C. The yield of polymer was 80 g. Analysis of the polymer gave by weight 63.2% carbon, 5.8% hydrogen and 7.0% nitrogen compared with calculated theory of 64.4%, 5.4% and 6.8% respectively.

*Example 3.—N-(p-cinnamoylphenyl) urethane of polyvinyl alcohol*

Five grams of the above prepared p-acetophenylurethane of polyvinyl alcohol was added to a mixture of 20 cc. of benzaldehyde and 100 cc. of dimethylformamide. To this was added 25 cc. of a 10% solution of sulfuric acid in acetic acid, and the mixture tumbled in the dark. After 72 hours, an almost colorless liquid was obtained, to which were added 25 cc. of a 10% solution of sodium acetate in acetic acid, and the mixture was then precipitated in methanol. The precipitated product was washed in fresh methanol and air dried at 40° C. During drying the fine white product darkened and hardened. Analysis of the product gave by weight 4.4% nitrogen compared with calculated theory for N-(p-cinnamoylphenyl) urethane of polyvinyl alcohol of 4.7% nitrogen. This result indicates that substantially all of the acetophenylurethane groups in the starting polymer had reacted with the benzaldehyde and that the product had the probable structure represented by the recurring units:

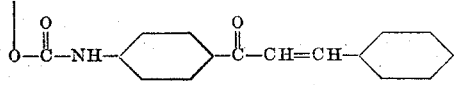

wherein $n$ has the previously defined meaning. A coating of the product when exposed through a negative and developed gave a stencil capable of being inked and used for printing.

*Example 4.—N-(p-acetophenyl) urethane of polyvinylbutyral*

(a) Forty grams of polyvinylbutyral containing 14.1% by weight of vinyl alcohol units was dissolved in 400 cc. of dry pyridine. The solution was stirred and heated on a steam bath under a reflux condenser and a solution of 24.7 g. (20 mol percent excess) of p-isocyanoacetophenone in 200 cc. of dry pyridine was added slowly. After 30 minutes, a clear orange solution was obtained.

This was heated for 6 hours and then allowed to stand at room temperature overnight. The solution was precipitated into 25 liters of water giving a sticky solid. The solid was redissolved in 500 cc. of acetone and reprecipitated in water giving a slightly yellow, fibrous solid which was air dried at 40° C. The yield of polymer was 43 g. Analysis of the polymeric product gave 2.6% by weight of nitrogen compared with calculated theory of 3.0% by weight of nitrogen. This result indicates that nearly all of the free hydroxyl groups in the starting polyvinylbutyral had been converted to the desired ester groups.

(b) Forty grams of polyvinylbutyral containing 21.9% by weight of vinyl alcohol units was dissolved in 400 cc. of dry pyridine. This was stirred and heated on a steam bath under a reflux condenser and 38.6 g. (20 mol percent excess) of p-isocyanoacetophenone was added slowly. In 30 minutes a light yellow solution was obtained. This was heated for 6 hours and then allowed to stand overnight at room temperature. The polymeric product was obtained as a sticky product on precipitation of the solution into 25 liters of water. The sticky product was redissolved in acetone (a preliminary acetone wash was necessary to remove excess water) and reprecipitated. This step was repeated and the product dried at 40° C. The yield was 50.5 g. of polymeric product. It analyzed 3.8% by weight of nitrogen compared with calculated theory of 3.9% nitrogen for the completely reacted polyvinylbutyral.

*Example 5.—N-(p-Cinnamoylphenyl)urethane of polyvinylbutyral*

(a) Five grams of the p-acetophenylurethane of polyvinylbutyral prepared by above Example 4 (a) was dissolved in 100 cc. of benzaldehyde and 5 cc. of a 10% solution of sulfuric acid in acetic acid was added. The mixture was stirred in the dark for 70 hours and then precipitated in methanol. The tan fibers obtained were leached in fresh methanol, dried, reprecipitated from dioxane into methanol, washed in fresh methanol, and the resulting white fibers dried at 40° C. The yield of fibrous polymeric product was 6.7 g. (before reprecipitation). Analysis of this product gave a nitrogen value of 2.3% by weight compared with calculated theory of 2.6% nitrogen. Accordingly, substantially all of the acetophenylurethane groups in the starting polymer had reacted with the benzaldehyde. In addition to containing the original recurring acetal groups represented by the structure:

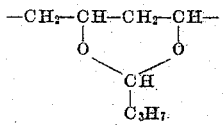

the polymer product also containing the recurring ester groups represented by the structure:

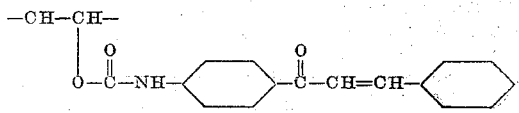

Sensitivity tests on the above polymeric product showed an unsensitized speed of 11 under compared with a speed of 2 under the same test conditions for unsensitized polyvinyl cinnamate.

(b) Five grams of the p-acetophenylurethane of polyvinylbutyral prepared by above Example 4 (b) was dissolved in 100 cc. of benzaldehyde and processed in the same manner as described in above section (a). The yield of polymeric product was 6.3 g. (before reprecipitation). Analysis of this product gave a nitrogen content of 2.8% by weight compared with calculated theory of 3.8% nitrogen. Accordingly, the product contained not only vinylbutyral groups and vinyl N-(p-cinnamoylphenyl) urethane groups, but also some unreacted vinyl alcohol groups. Sensitivity tests on the above product showed an unsensitized speed of 40 compared with a speed of 2 under the same test conditions for unsensitized polyvinyl cinnamate.

*Example 6.—N - [p - (p - methoxy)cinnamoylphenyl]urethane of polyvinylbutyral*

(a) Five grams of the p-acetophenylurethane of polyvinylbutyral prepared by above Example 4 (b) was dissolved in 100 cc. of p-anisaldehyde and filtered. To this was added 5 cc. of a 10% solution of sulfuric acid in acetic acid and the mixture stirred in the dark. After 73 hours, 20 cc. of a 10% solution of sodium acetate in acetic acid was added to the dark, viscous solution, and it was diluted to 100 cc. with dioxane. The solution was then precipitated in methanol and the yellow fibers obtained were first washed in fresh methanol and then air dried at 40° C. The dry polymeric product was reprecipitated from dioxane into methanol, washed in fresh methanol and again air dried at 40° C. Analysis of this product gave a nitrogen value of 2.3% by weight and a methoxyl content of 3.2% by weight. Accordingly, the product consisted of a combination of the original recurring vinylbutyral groups, and the recurring ester groups represented by the structure:

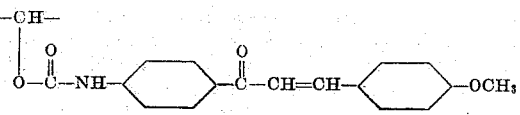

Sensitivity tests on the above product, when coated on a sheet of surface-hydrolyzed cellulose acetate, showed an unsensitized speed of 280 compared with a speed of 2 under the same test conditions for unsensitized polyvinyl cinnamate.

(b) Five grams of the p-acetophenylurethane of polyvinylbutyral prepared according to above Example 4 (b) was dissolved in a mixture of 80 cc. of dry dioxane and 20 cc. of p-anisaldehyde, and the solution filtered. To the filtrate, there was added 5 cc. of a 10% solution of sulfuric acid in acetic acid, and the mixture was stirred in the dark. After 73 hours, 20 cc. of a 10% solution of sodium acetate in acetic acid was added, and the mixture was diluted with 100 cc. of dioxane. The polymer was precipitated in methanol giving slightly yellow colored fibers which agglomerated upon filtration. The polymer residue was washed in fresh methanol to give a crumbly product which was air dried at 40° C. This crude product was dissolved in dioxane and reprecipitated in methanol, washed with fresh methanol and again air dried at 40° C. It had a nitrogen content of 3.0% by weight and a methoxyl group content of between 2.8 and 3.1% by weight. The methoxyl group value is equivalent to from 28–32% by weight of vinyl-N-[p-(p-methoxy)cinnamoylphenyl]urethane groups in the polymer, the remainder of the polymer comprising vinylbutyral groups, and unreacted N-(p-acetophenyl) urethane groups. Sensitivity tests on the above product showed an unsensitized speed factor of 250 compared with a speed of 2 under the same test conditions for unsensitized polyvinyl cinnamate.

*Example 7.—N-(p-cinnamoylphenyl)urethane of polyvinylacetal*

Twenty-five grams of polyvinylacetal (dried over $P_2O_5$ in vacuo) containing 13% by weight of free vinyl alcohol groups was dissolved in 300 cc. of dry pyridine at steam bath temperature (at least 90° C.). To this was added 13 g. (8 mol per cent excess) of p-isocyanoacetophenone in 100 cc. of dry pyridine, and the mixture heated on a steam bath and stirred. After 17 hours of heating, the dark solution obtained was diluted with 500 cc. of acetone and precipitated in 10 liters of ether giving a brown, gummy precipitate. The polymeric product was washed in fresh ether, dried and redissolved in 200 cc.

of acetone and reprecipitated in hot water giving tan colored fibers. These were washed in fresh, hot water and air dried at 40° C. The yield of polymer fiber was 21.1 g. Analysis of the fiber product gave a nitrogen content of 2.3% by weight compared to calculated theory of 2.8% by weight of nitrogen.

Five grams of the above prepared p-acetophenylurethane of polyvinylacetal was dissolved in 200 cc. of benzaldehyde and the solution filtered. To this solution, there was added 5 cc. of a 10% solution of sulfuric acid in acetic acid, and the mixture then stored in the dark. After a period of 71 hours, 10 cc. of a 10% solution of sodium acetate in acetic acid was added with stirring, and the mixture was then precipitated in methanol, the precipitated polymeric product being washed in fresh methanol and air dried at 40° C. The product was reprecipitated from methyl ethyl ketone into methanol, washed in fresh methanol and again air dried at 40° C. The yield of product was 4.5 g. Analysis gave a nitrogen content of 1.5% by weight compared with calculated theory of 2.3% nitrogen by weight. This result indicates that approximately 31% by weight of the polymeric product consisted of vinyl-N-(p-cinnamoylphenyl)urethane groups, the remainder of the polymeric product being vinylacetal groups and possibly some vinyl alcohol groups. Sensitivity tests on the above product showed an unsensitized speed of 40 compared with a speed of 2 under the same test conditions for unsensitized polyvinyl cinnamate. When 2-benzoylmethylene-1-methyl-β-naphthothiazoline was added as a sensitizer to the above polymeric product, the speed increased to 65 under the same test conditions.

*Example 8.—N-(p-cinnamoylphenyl)urethane of cellulose ethyl ether*

Twenty-five grams of cellulose ethyl ether (dried over $P_2O_5$ in vacuo) containing 46.9% ethoxyl was dissolved in 300 cc. of dry pyridine. To this solution there was added 13 g. (12 mol per cent excess) of p-isocyanoacetophenone in 100 cc. of dry pyridine and mixture heated on a steam bath and stirred. After 17 hours the tan solution obtained was diluted with 500 cc. of acetone and precipitated in 10 liters of water. The precipitated product was washed with fresh water and air dried. The white fibers obtained were dissolved in 100 cc. of acetone and reprecipitated in water, and then air dried at 40° C. The yield of polymer fiber was 29 g. Analysis of the fiber product gave a nitrogen content of 2.7% by weight compared with calculated theory of 2.7% by weight of nitrogen. This result indicates that substantially all of the free hydroxyl groups in the starting cellulose ethyl ether had been converted to the carbamate group,

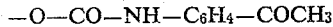
—O—CO—NH—C$_6$H$_4$—COCH$_3$ equivalent to approximately 32% of the polymer weight.

Five grams of the above prepared p-acetophenylurethane of cellulose ethyl ether was dissolved in 200 cc. of benzaldehyde and the solution filtered. To this solution there was added 5 cc. of a 10% solution of sulfuric acid in acetic acid and the mixture stored in the dark. After a period of 71 hours, 10 cc. of a 10% solution of sodium acetate in acetic acid was added. This solution containing the unseparated polymeric product, N-(p-cinnamoylphenyl)urethane of cellulose ethyl ether, was used to prepare a light-sensitive coating on a paper base.

*Example 9.—N-(p-cinnamoylphenyl)urethane of cellulose acetate*

Twenty-five grams of cellulose acetate containing 21% by weight of acetyl (dried over $P_2O_5$ in vacuo) was dissolved in 300 cc. of dry pyridine and 45 g. (12 mol per cent excess) of p-isocyanoacetophenone in 100 cc. of dry pyridine was added, and the mixture heated on a steam bath and stirred. After 17 hours the tan colored solution obtained was diluted with 500 cc. of acetone and precipitated in methanol. The light colored, fibrous residue was washed in fresh methanol and air dried at 40° C. The dry product was then dissolved in 500 cc. of acetone and reprecipitated in fresh methanol and again air dried at 40° C. The yield of polymeric product was 34.1 g. Analysis of the product gave a ntrogen content of 4.3% by weight compared with calculated theory of 5.3% by weight of nitrogen.

Five grams of the above prepared p-acetophenylurethane of cellulose acetate was dissolved in 200 cc. of benzaldehyde containing 15 cc. of dioxane, and the solution was filtered. To this solution there was added 5 cc. of a 10% solution of sulfuric acid in acetic acid, and the mixture then stored in the dark. After a period of 71 hours, 10 cc. of a 10% solution of sodium acetate in acetic acid was added, and the polymer precipitated in methanol. The polymeric product obtained was washed in fresh methanol, dried and reprecipitated from methyl ethyl ketone into methanol. The white fibers were washed in methanol and air dried at 40° C. The yield of product was approximately 5 g. Analysis of the product gave a nitrogen content of 3.5% by weight compared with calculated theory of 4.3% by weight of nitrogen. Accordingly, the product was N-(p-cinnamoylphenyl)urethane of cellulose acetate. Sensitivity tests on the above obtained product showed an unsensitized speed of 220 compared with a speed of 2 under the same test conditions for unsensitized polyvinyl cinnamate. When 2-benzoylmethylene-1-β-naphthothiazole was added as a sensitizer to the above product, the speed increased to 450 under the same test conditions.

By proceeding as set forth in the above examples, other polymers coming within the scope of the invention can be prepared, for example, N-(p-cinnamoylphenyl)urethane of polyvinylpropional, N-(p-cinnamoylphenyl)urethanes of hydrolyzed vinyl acetate-ethylene copolymers, N-[p-(p-sulfo)cinnamoylphenyl] urethane of polyvinyl alcohol, N-[p-(p-hydroxy)cinnamoylphenyl]urethane of polyvinyl alcohol, N-[p-(p-dimethylamino)cinnamoylphenyl]urethane of polyvinyl alcohol, N-[p-(3,4-dimethoxy)cinnamoylphenyl]urethane of polyvinyl butyral N-(p-cinnamoylphenyl)urethane of polyvinylpropional, N-(p-cinnamoylphenyl)urethane of cellulose acetate-propionate, N-(p-cinnamoylphenyl)urethane of cellulose acetate-butyrate, and the like. From the foregoing it will be understood that our process is operable with any free hydroxyl group containing organic polymers to give the light-sensitive derivatives of our invention. Even low percentages of p-cinnamoylphenyl urethane groups in the polymer molecule give noticeable insolubilization on exposure to light, the effect increasing with the increased number of such groups. Where a hydrolyzed copolymer of an unsaturated alcohol acylate and another monoethylenically unsaturated, polymerizable monomer is employed, the ratio of monomers in the copolymers can vary from 5 to 95 mol per cent, but preferably from 50 to 95 mol per cent, of the hydrolyzed monomer component, the remainder of the copolymer in each case being the other monoethylenically unsaturated, polymerizable monomer component.

What we claim is:

1. A process for preparing an N-(p-cinnamoylphenyl)-urethane of a hydroxyl-containing polymer selected from the group consisting of polyvinyl alcohol, a polyvinyl acetal containing free hydroxyl groups, a polyvinyl butyral containing free hydroxyl groups, a cellulose ethyl ether containing free hydroxyl groups and a cellulose carboxylic ester containing free hydroxyl groups which comprises reacting the said polymer with p-isocyanoacetophenone to give the intermediate p-acetophenylurethane derivative of the polymer, and then reacting the said intermediate with an aromatic aldehyde selected from those represented by the following general formula:

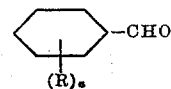

wherein $n$ represents a whole number not greater than 2 and R represents a member selected from the group consisting of an atom of hydrogen, a chlorine atom, a bromine atom, an alkyl group containing from 1 to 4 carbon atoms, an alkoxy group containing from 1 to 4 carbon atoms, an acetamido group, a —COOR$_1$ group wherein R$_1$ represents a member selected from the group consisting of an atom of hydrogen and an alkali metal atom, an —SO$_3$R$_1$ group wherein R$_1$ has the above definition and an

group wherein each R$_2$ represents an alkyl group containing from 1 to 4 carbon atoms, thereby forming a polymer having the recurring N-(p-cinnamoylphenyl)-urethane group represented by the structure

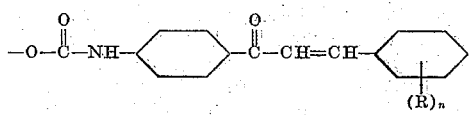

wherein $n$ and R have the above definitions.

2. A process for preparing an N-(p-cinnamoylphenyl)-urethane of polyvinyl alcohol which comprises reacting polyvinyl alcohol with p-isocyanoacetophenone to give the intermediate p-acetophenylurethane derivative of the said polyvinyl alcohol, and then reacting the said intermediate with an aromatic aldehyde selected from those represented by the following general formula:

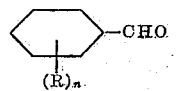

wherein $n$ represents a whole number not greater than 2 and R represents a member selected from the group consisting of an atom of hydrogen, a chlorine atom, a bromine atom, an alkyl group containing from 1 to 4 carbon atoms, an alkoxy group containing from 1 to 4 carbon atoms, an acetamido group, a —COOR$_1$ group wherein R$_1$ represents a member selected from the group consisting of an atom of hydrogen and an alkali metal atom, an —SO$_3$R$_1$ group wherein R$_1$ has the above definition and an

group wherein each R$_2$ represents an alkyl group containing from 1 to 4 carbon atoms, thereby forming an N-(p-cinnamoylphenyl)urethane of polyvinyl alcohol wherein the urethane group is represented by the structure

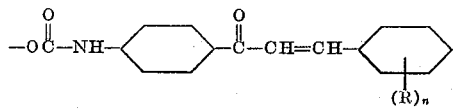

wherein $n$ and R have the above definitions.

3. A process for preparing an N-(p-cinnamoylphenyl)-urethane of a polyvinylacetal containing free hydroxyl groups which comprises reacting the said polyvinylacetal with p-isocyanoacetophenone to give the intermediate p-acetophenylurethane derivative of the said polyvinylacetal, and then reacting the said intermediate with an aromatic aldehyde selected from those represented by the following general formula:

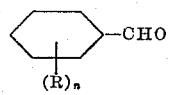

wherein $n$ represents a whole number not greater than 2 and R represents a member selected from the group consisting of an atom of hydrogen, a chlorine atom, a bromine atom, an alkyl group containing from 1 to 4 carbon atoms, an alkoxy group containing from 1 to 4 carbon atoms, an acetamido group, a —COOR$_1$ group wherein R$_1$ represents a member selected from the group consisting of an atom of hydrogen and an alkali metal atom, an —SO$_3$R$_1$ group wherein R$_1$ has the above definition and an

group wherein each R$_2$ represents an alkyl group containing from 1 to 4 carbon atoms, thereby forming an N-(p-cinnamoylphenyl)urethane of the said polyvinylacetal wherein the urethane group is represented by the structure

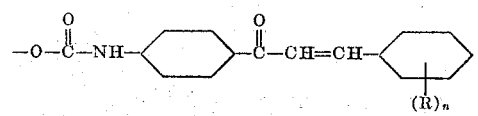

wherein $n$ and R have the above definitions.

4. A process for preparing an N-(p-cinnamoylphenyl) urethane of a polyvinylbutyral containing free hydroxyl groups which comprises reacting the said polyvinylbutyral with p-isocyanoacetophenone to give the intermediate p-acetophenylurethane derivative of the said polyvinylbutyral, and then reacting the said intermediate with an aromatic aldehyde selected from those represented by the following general formula:

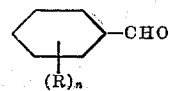

wherein $n$ represents a whole number not greater than 2 and R represents a member selected from the group consisting of an atom of hydrogen, a chlorine atom, a bromine atom, an alkyl group containing from 1 to 4 carbon atoms, an alkoxy group containing from 1 to 4 carbon atoms, an acetamido group, a —COOR$_1$ group wherein R$_1$ represents a member selected from the group consisting of an atom of hydrogen and an alkali metal atom, an —SO$_3$R$_1$ group wherein R$_1$ has the above definition and an

group wherein each R$_2$ represents an alkyl group containing from 1 to 4 carbon atoms, thereby forming an N-(p-cinnamoylphenyl)urethane of the said polyvinylbutyral wherein the urethane group is represented by the structure

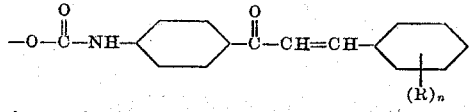

wherein $n$ and R have the above definitions.

5. A process for preparing an N-(p-cinnamoylphenyl) urethane of a cellulose ethyl ether containing free hydroxyl groups which comprises reacting the said cellulose ethyl ether with p-isocyanoacetophenone to give the intermediate p-acetophenylurethane derivative of the said cellulose ethyl ether, and then reacting the said intermediate with an aromatic aldehyde selected from those represented by the general formula:

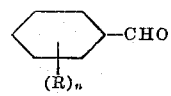

wherein $n$ represents a whole number not greater than 2 and R represents a member selected from the group consisting of an atom of hydrogen, a chlorine atom, a bromine atom, an alkyl group containing from 1 to 4 carbon atoms, an alkoxy group containing from 1 to 4 carbon atoms, an acetamido group, a —COOR₁ group wherein R₁ represents a member selected from the group consisting of an atom of hydrogen and an alkali metal atom, an —SO₃R₁ group wherein R₁ has the above definition and an

group wherein each R₂ represents an alkyl group containing from 1 to 4 carbon atoms, thereby forming an N-(p-cinnamoylphenyl)urethane of the said cellulose ethyl ether wherein the urethane group is represented by the structure

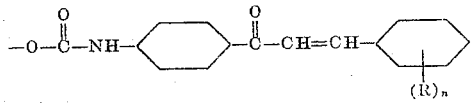

wherein $n$ and R have the above definitions.

6. A process for preparing an N-(p-cinnamoylphenyl)urethane of a cellulose carboxylic ester containing free hydroxyl groups which comprises reacting the said cellulose carboxylic ester with p-isocyanoacetophenone to give the intermediate p-acetophenylurethane derivative of the said cellulose carboxylic ester, and then reacting the said intermediate with an aromatic aldehyde selected from those represented by the general formula:

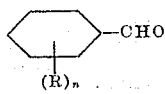

wherein $n$ represents a whole number not greater than 2 and R represents a member selected from the group consisting of an atom of hydrogen, a chlorine atom, a bromine atom, an alkyl group containing from 1 to 4 carbon atoms, an alkoxy group containing from 1 to 4 carbon atoms, an acetamido group, a —COOR₁ group wherein R₁ represents a member selected from the group consisting of an atom of hydrogen and an alkali metal atom, an —SO₃R₁ group wherein R₁ has the above definition and an

group wherein each R₂ represents an alkyl group containing from 1 to 4 carbon atoms, thereby forming an N-(p-cinnamoylphenyl)urethane of the said cellulose carboxylic ester wherein the urethane group is represented by the structure

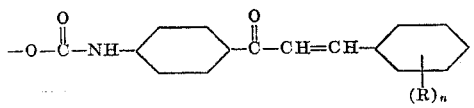

wherein $n$ and R have the above definitions.

7. A process for preparing an N-(p-cinnamoylphenyl)urethane of polyvinyl alcohol which comprises reacting polyvinyl alcohol with p-isocyanoacetophenone to give the intermediate p-acetophenylurethane derivative of the said polyvinyl alcohol, and then reacting the said intermediate with benzaldehyde, thereby forming N-(p-cinnamoylphenyl)urethane of polyvinyl alcohol.

8. A process for preparing an N-(p-cinnamoylphenyl)urethane of a polyvinylacetal containing free hydroxyl groups which comprises reacting the said polyvinylacetal with p-isocyanoacetophenone to give the intermediate p-acetophenylurethane derivative of the said polyvinylacetal, and then reacting the said intermediate with benzaldehyde, thereby forming an N-(p-cinnamoylphenyl)urethane of the said polyvinylacetal.

9. A process for preparing an N-[p-(p-methoxy)cinnamoylphenyl]urethane of a polyvinylbutyral containing free hydroxyl groups which comprises reacting the said polyvinylbutyral with p-isocyanoacetophenone to give the intermediate p-acetophenylurethane derivative of the said polyvinylbutyral, and then reacting the said intermediate with p-anisaldehyde, thereby forming N-[p-(p-methoxy)-cinnamoylphenyl]urethane of the said polyvinylbutyral.

10. A process for preparing an N-(p-cinnamoylphenyl)urethane of a cellulose ethyl ether containing free hydroxyl groups which comprises reacting the said cellulose ethyl ether with p-isocyanoacetophenone to give the intermediate p-acetophenylurethane derivative of said cellulose ethyl ether, and then reacting the said intermediate with benzaldehyde, thereby forming N-(p-cinnamoylphenyl)-urethane of the said cellulose ethyl ether.

11. A process for preparing an N-(p-cinnamoylphenyl)urethane of a cellulose carboxylic ester containing free hydroxyl groups which comprises reacting the said cellulose carboxylic ester with p-isocyanoacetophenone to give the intermediate p-acetophenylurethane derivative of the said cellulose carboxylic ester, and then reacting the said intermediate with benzaldehyde, thereby forming N-(p-cinnamoylphenyl)urethane of the said cellulose carboxylic ester.

12. A polymer obtained by the process of claim 1.
13. A polymer obtained by the process of claim 7.
14. A polymer obtained by the process of claim 8.
15. A polymer obtained by the process of claim 9.
16. A polymer obtained by the process of claim 10.
17. A polymer obtained by the process of claim 11.

No references cited.